United States Patent
Oba

(10) Patent No.: US 8,576,416 B2
(45) Date of Patent: Nov. 5, 2013

(54) IMAGE PROCESSING APPARATUS AND CONTROL METHOD THEREOF AND STORAGE MEDIUM THAT CHANGES UI SETTING DATA TO SETTING FOR SUBSTITUTIONAL EXECUTION OF FUNCTION BY ANOTHER APPARATUS

(75) Inventor: Yoshitaka Oba, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 574 days.

(21) Appl. No.: 12/684,361

(22) Filed: Jan. 8, 2010

(65) Prior Publication Data
US 2010/0208291 A1 Aug. 19, 2010

(30) Foreign Application Priority Data

Feb. 19, 2009 (JP) ................................. 2009-037054

(51) Int. Cl.
*G06K 15/00* (2006.01)
(52) U.S. Cl.
USPC ........ 358/1.13; 358/1.15; 358/1.14; 358/1.16
(58) Field of Classification Search
USPC ........ 358/1.13–1.15; 715/765, 747, 744, 766, 715/740, 748
See application file for complete search history.

(56) References Cited

U.S. PATENT DOCUMENTS

| | | | | |
|---|---|---|---|---|
| 5,832,298 A * | 11/1998 | Sanchez et al. | | 710/8 |
| 6,674,537 B2 | 1/2004 | Kadowaki | | 358/1.15 |
| 6,809,831 B1 * | 10/2004 | Minari | | 358/1.15 |
| 7,343,402 B2 * | 3/2008 | Hagiwara | | 709/220 |
| 7,515,290 B2 * | 4/2009 | Negishi et al. | | 358/1.15 |
| 7,948,643 B2 * | 5/2011 | Aritomi | | 358/1.13 |
| 8,127,177 B2 * | 2/2012 | Nakajima | | 714/17 |
| 8,213,032 B2 * | 7/2012 | Amano | | 358/1.14 |
| 2003/0206314 A1 * | 11/2003 | Tanimoto | | 358/1.15 |
| 2005/0068547 A1 * | 3/2005 | Negishi et al. | | 358/1.1 |
| 2005/0190395 A1 * | 9/2005 | Aritomi | | 358/1.13 |
| 2007/0019229 A1 * | 1/2007 | Matsuhara | | 358/1.15 |
| 2007/0219839 A1 * | 9/2007 | Tanabe | | 705/8 |

FOREIGN PATENT DOCUMENTS

JP  11-017862  1/1999

\* cited by examiner

*Primary Examiner* — Twyler Haskins
*Assistant Examiner* — Dennis Dicker
(74) *Attorney, Agent, or Firm* — Fitzpatrick, Cella, Harper & Scinto

(57) ABSTRACT

An image processing apparatus, connectable with plural image processing apparatuses via a network, which performs image processing. UI setting data is received from an another image processing apparatus, and it is determined whether or not a function included in the received UI setting data can be executed by the apparatus itself. If it is determined that the function cannot be executed by the image processing apparatus, a first image processing apparatus which can execute the function is retrieved on the network. Then setting is changed such that the function is substitutionally executed by the first image processing apparatus.

11 Claims, 15 Drawing Sheets

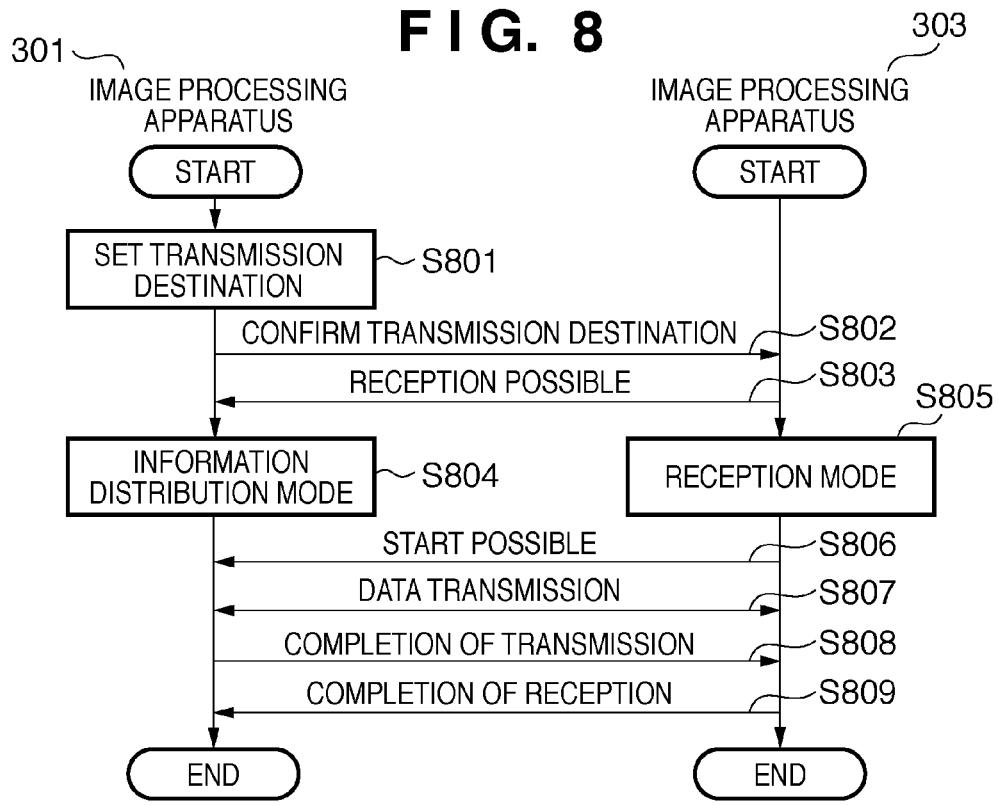
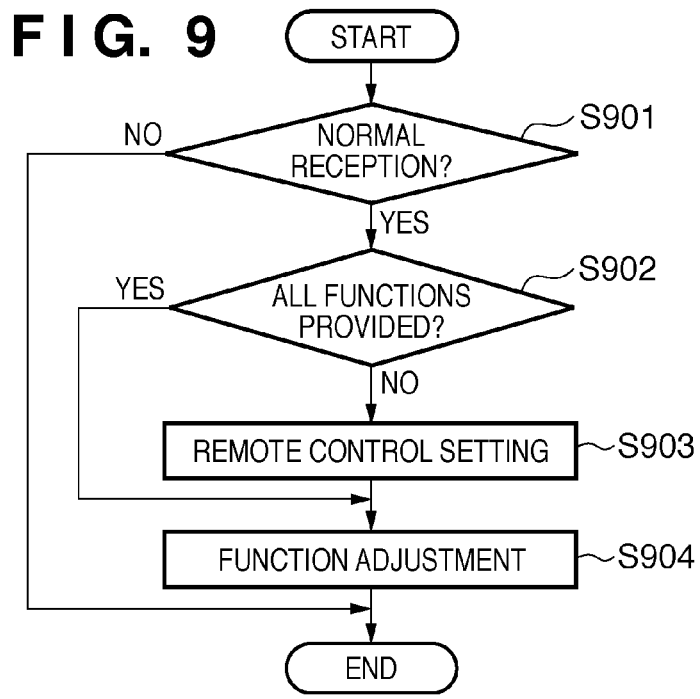

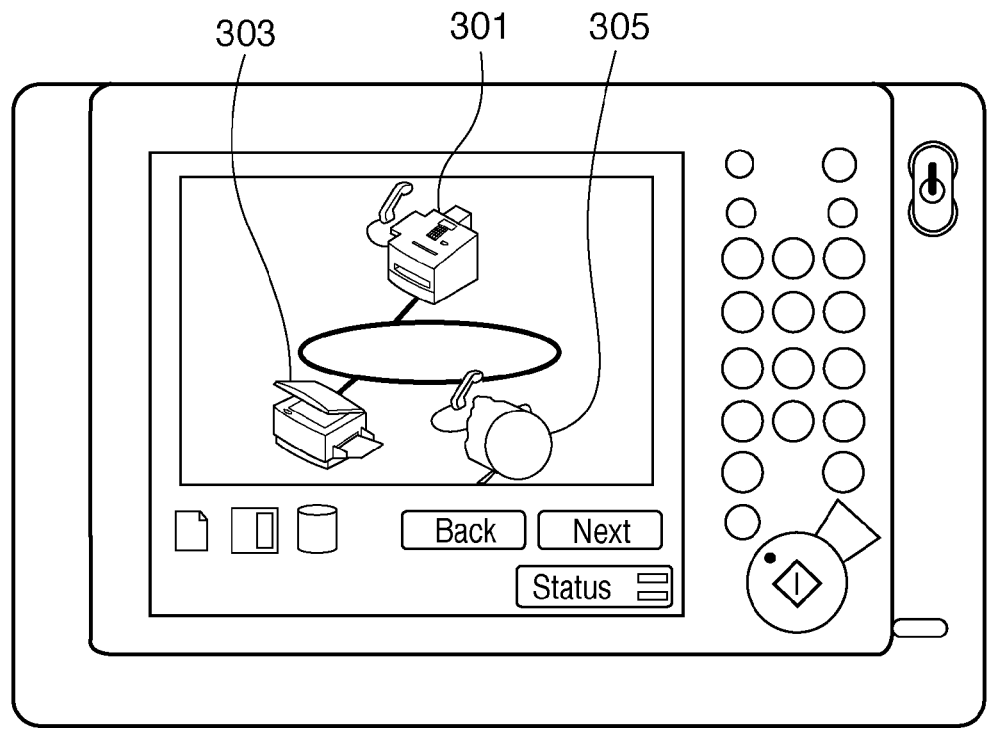
F I G. 12

IMAGE PROCESSING APPARATUS AND CONTROL METHOD THEREOF AND STORAGE MEDIUM THAT CHANGES UI SETTING DATA TO SETTING FOR SUBSTITUTIONAL EXECUTION OF FUNCTION BY ANOTHER APPARATUS

BACKGROUND OF THE INVENTION

1. Field of the Invention

The present invention relates to an image processing apparatus and a control method thereof and a computer-readable storage medium storing a program, for transmission/reception of UI setting data among multiple image processing apparatuses connected via a network.

2. Description of the Related Art

Conventionally, an image processing apparatus, such as a copier or a facsimile apparatus, generally provides various functions by itself. On the other hand, a multifunction peripheral (MFP) connectable via a network has appeared, and an image processing system constructed by connecting these MFPs is known. For example, image data obtained by reading an original with a scanner function of one MFP is transmitted using a FAX function of another MFP, thereby FAX transmission by scanning an original by a device without facsimile function is realized. Further, by connecting MFPs to a network, for example, user-specific UI setting data can be utilized on various MFPs via the network (See Japanese Patent Application Laid-Open No. 11-17862).

However, conventionally, when UI setting data is received and utilized, only function(s) executable by the apparatus which received the UI setting data itself in the received UI setting data can be utilized. Accordingly, a function, which can be performed by using plural apparatuses in cooperation, cannot be utilized.

SUMMARY OF THE INVENTION

An aspect of the present invention is to eliminate the above-mentioned problems with the conventional technology.

Another aspect of the present invention is, when UI setting data received from another apparatus includes a non-executable function by an image processing apparatus, the image processing apparatus implements the function based on the received UI setting data by substitutional execution of the function by using another image processing apparatus.

According to an aspect of the present invention, there is provided an image processing apparatus, connectable with multiple image processing apparatuses via a network, which performs image processing, the apparatus comprising: a reception unit that receives UI setting data from another image processing apparatus via the network; a determination unit that determines whether or not a function included in the UI setting data received by the reception unit can be executed by the image processing apparatus; a retrieval unit that, if the determination unit determines that the function cannot be executed by the image processing apparatus, retrieves a first image processing apparatus which can execute the function on the network; and a change unit that changes the UI setting data received by the reception unit to setting for substitutional execution of the function by the first image processing apparatus retrieved by the retrieval unit.

According to another aspect of the present invention, there is provided a control method for an image processing apparatus, connectable with plural image processing apparatuses via a network, which performs image processing, the method comprising: receiving UI setting data from another image processing apparatus via the network; determining whether or not a function included in the UI setting data received in the receiving step can be executed by the image processing apparatus; retrieving a first image processing apparatus which can execute the function on the network, if it is determined in the determining step that the function cannot be executed by the image processing apparatus; and changing the UI setting data received in the receiving step to setting for substitutional execution of the function by the first image processing apparatus retrieved in the retrieving step.

Further features and aspects of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a flowchart describing processing for transmission of customized UI setting data from a first image processing apparatus to a second image processing apparatus in the image processing system according to the first embodiment;

FIG. 9 is a flowchart describing processing by the image processing apparatus which received the customized UI setting data in the image processing system according to the first embodiment;

FIG. 12 depicts a view illustrating an example of a UI screen display upon retrieval of an image processing apparatus which can perform substitutional execution, in the image processing system according a third embodiment of the present invention;

DESCRIPTION OF THE EMBODIMENTS

Embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
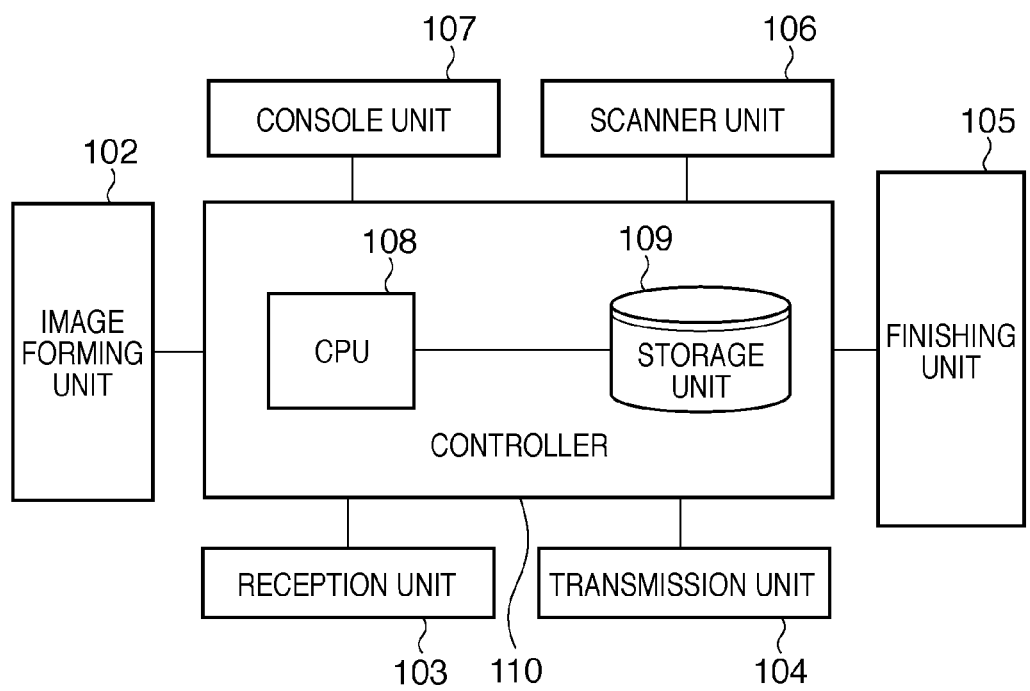
FIG. 1 is a block diagram illustrating a configuration of an image processing apparatus according to a first embodiment of the present invention.

FIG. 1 is a block diagram describing a configuration of an image processing apparatus according to a first embodiment of the present invention.

The image processing apparatus is a network-connectable multifunction peripheral (MFP) available as a scanner, a facsimile, a printer, a copier, and a storage. An image forming unit 102 forms (prints) an image on a sheet (print medium) by the electrophotographic method or the like. A reception unit 103 receives data transmitted from an external device via a network or the like. Further, a transmission unit 104 transmits data to the external device via the network. A finishing unit 105 performs post-processing such as stapling and bookbinding on the sheets subjected to the printing by the image forming unit 102. Note that the finishing unit 105 may be a separate device from the image processing apparatus. A scanner unit 106 reads an original and generates image data of the original. A console unit 107 has a touch panel including a display unit and a key input unit. The console unit 107 receives instruction operations regarding various functions by a user's operation. A central processing unit (CPU) 108 controls the respective units of the image processing apparatus. A storage unit 109 holds programs executed by the CPU 108 and various data such as image data. A controller 110, having the CPU 108 and the storage unit 109, controls the operation of the entire image processing apparatus, and provides various functions to be described later. Note that it is not necessary for the image processing apparatus to have all the functions but the image processing apparatus may have only a part of the functions.

Figure 2:
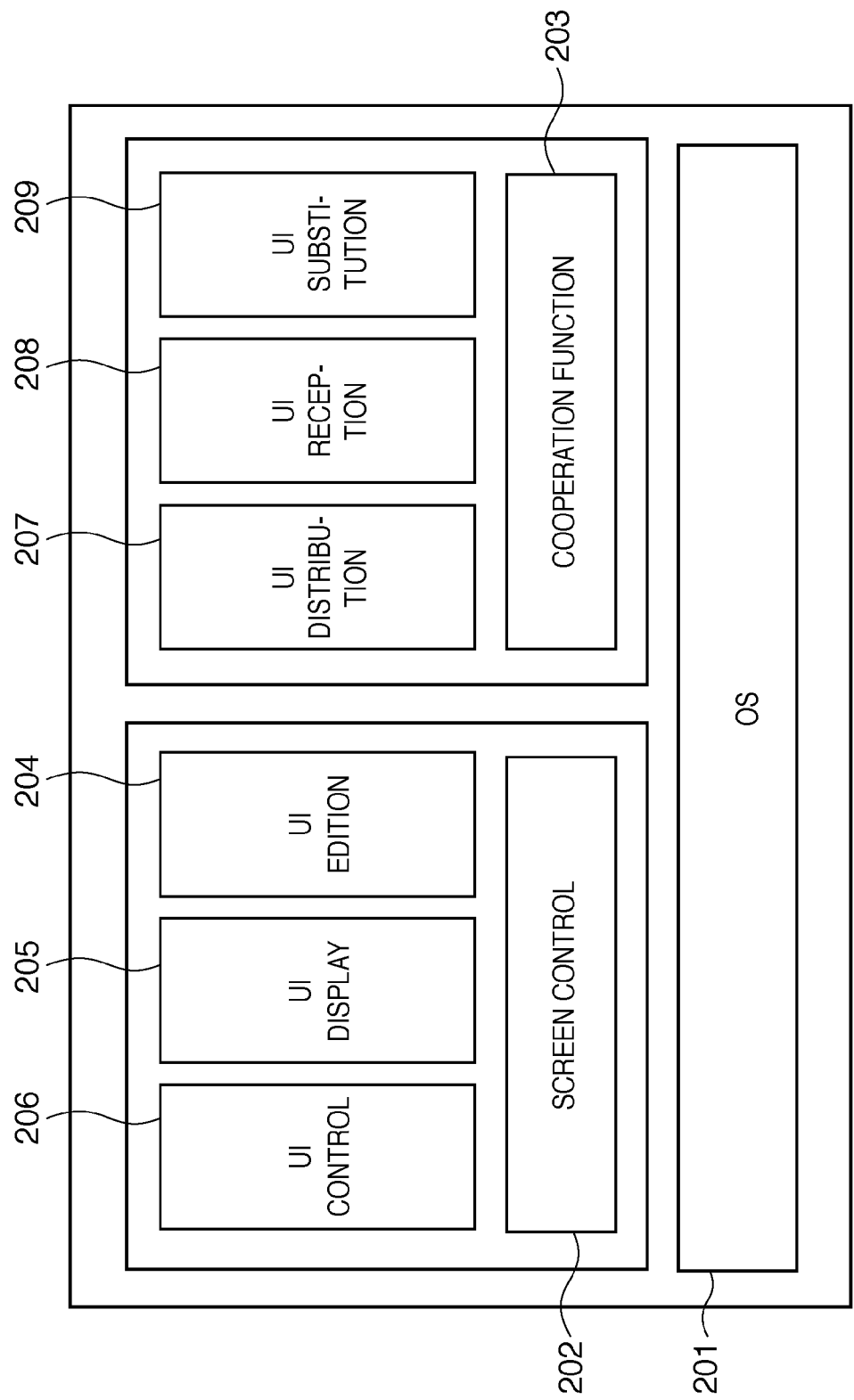
FIG. 2 is a block diagram illustrating a software construction of the image processing apparatus according to the first embodiment.

FIG. 2 is a block diagram describing a software construction of the image processing apparatus according to the present embodiment. The software is executed by the CPU 108.

The image processing apparatus operates on an operating system (OS) 201 for control and management of all the functions. Applications executed on the OS 201 are a screen control 202 as an application for display control with respect to the console unit 107 and a cooperation function 203 as an application for communication with other apparatuses for user interface (UI) setting. The screen control 202 has a UI edition 204 for UI customization in accordance with user's preference, a UI display 205 for display of a customized screen on the console unit 107, and a UI control 206 for association between the customized screen setting and function(s). The cooperation function 203 has a UI distribution 207 for distribution of customized UI to another apparatus, a UI reception 208 for reception of customized UI from another apparatus, and a UI substitution 209 for conversion of received UI in correspondence with a function of the image processing apparatus.

Figure 3:
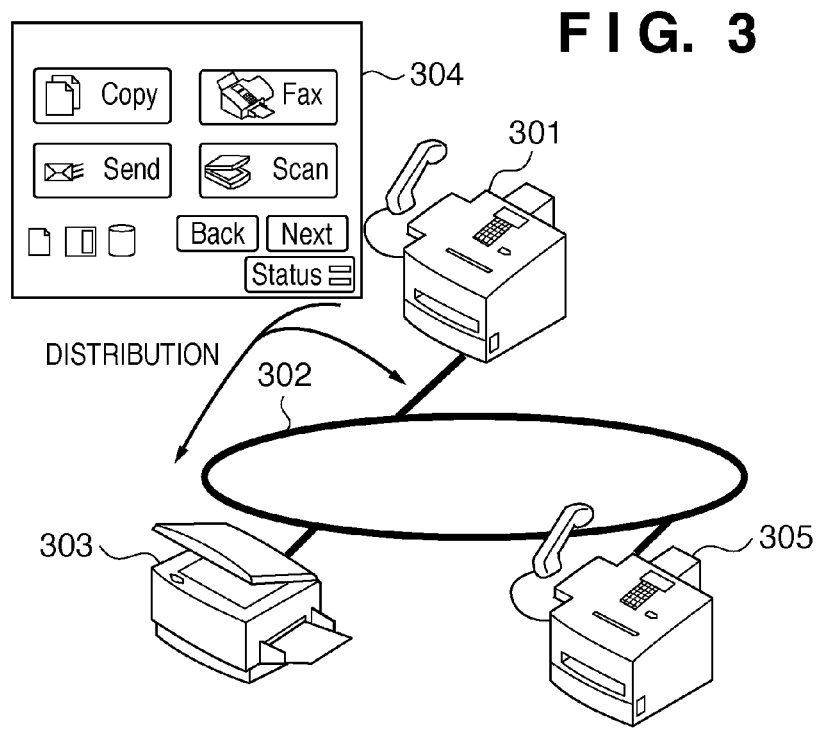
FIG. 3 depicts a view describing an example of an image processing system including the image processing apparatus according to the first embodiment.

FIG. 3 depicts a view illustrating an example of an image processing system including the image processing apparatus according to the present embodiment.

The image processing apparatus 301 is connected to image processing apparatuses 303 and 305 via a network 302. Reference numeral 304 denotes a screen setting customized in the image processing apparatus 301. The image processing apparatus 301 distributes the screen setting 304 to, for example, the image processing apparatus 303, and the image processing apparatus 303 displays a screen based on the distributed screen setting. Note that these image processing apparatuses 301 and 305 have the same configuration as that of the image processing apparatus described in FIGS. 1 and 2, however, the image processing apparatus 303 lacks a facsimile communication function, an image processing function or a printing function.

Figure 4:
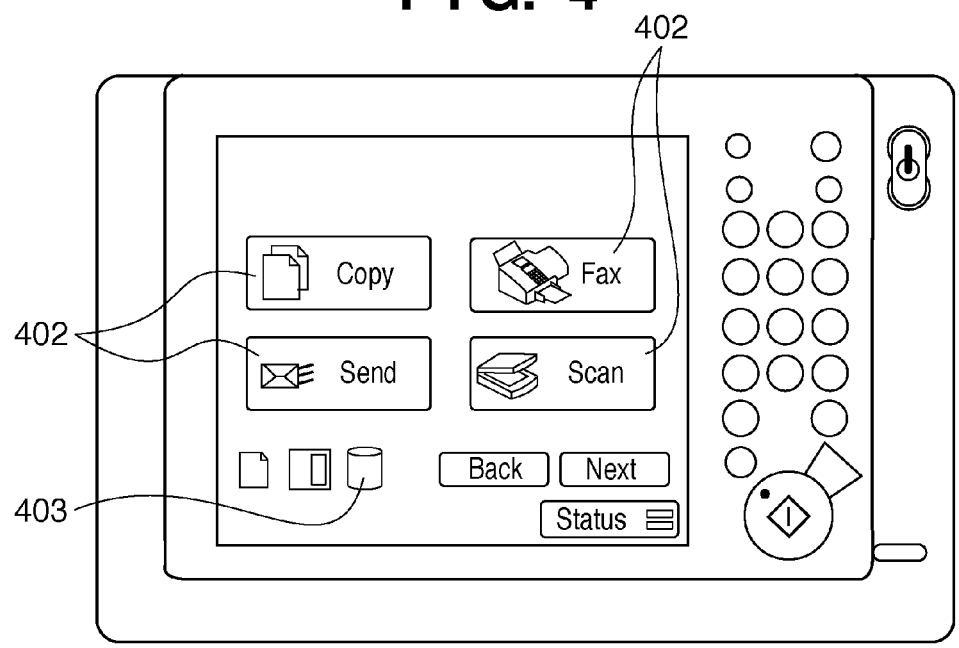
FIG. 4 depicts a view illustrating an example of an interface screen displayed on a console unit of the image processing apparatus according to the first embodiment.

FIG. 4 depicts a view illustrating an example of an interface screen displayed on the console unit 107 of the image processing apparatus 301 according to the first embodiment.

The example of the screen shown in FIG. 4 has a list of functions of the image processing apparatus and plural buttons such as function selection buttons 402 and function registration buttons 403. The function selection buttons 402 show the list of functions in which the image processing apparatus has, or correspond to function operation program desired by the user in correspondence with each of the function selection buttons. In FIG. 4, as the function selection buttons 402, a facsimile function (Fax), a copying function (Copy), a transmission function (Send) and a scanning function (Scan) are shown. When the user depresses a desired function selection button 402 on this operation screen, a function operation program corresponding to the depressed button is launched, and the function can be utilized.

Figure 5:
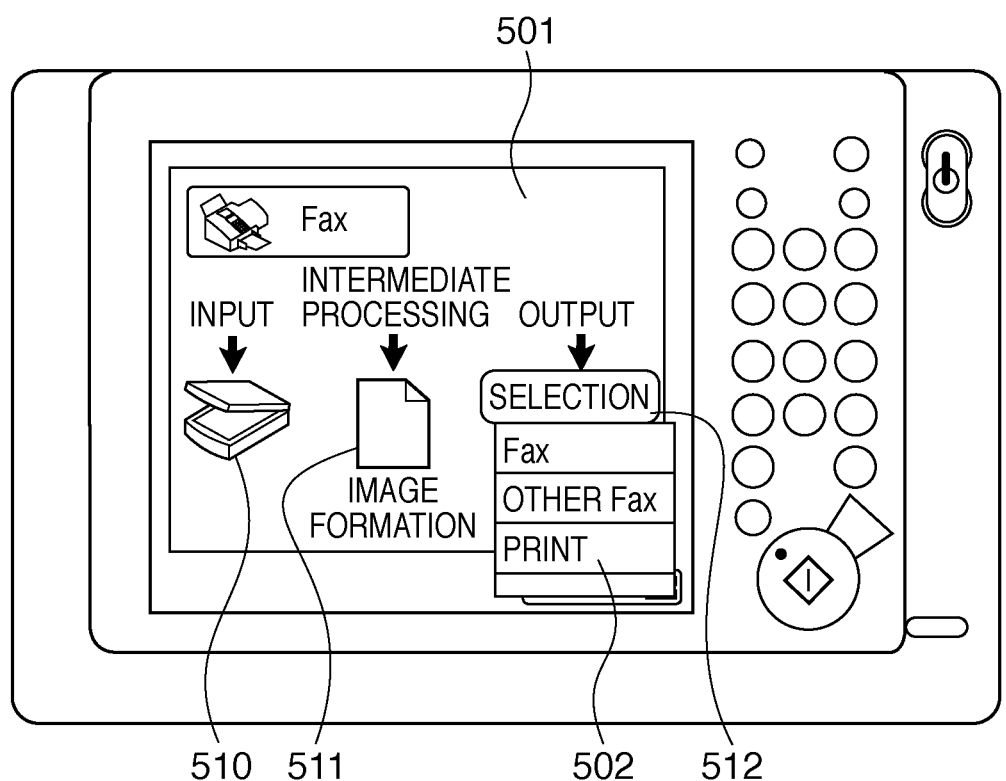
FIG. 5 depicts a view illustrating an example of customization of an operation screen according to the first embodiment.

FIG. 5 depicts a view illustrating an example of customization of the UI screen by the image processing apparatus 301 according to the first embodiment.

In this example, a function selection button desired by the user is registered as the function selection button 402 shown in FIG. 4. This function registration screen 501 is displayed on the display unit of the console unit 107 by depression of the function registration button 403 in FIG. 4. In the function registration screen 501, various processing steps and processing candidates 502 are displayed for the user's selection. The user touches a desired function item to select processing, thereby generates a user desired function selection button.

FIG. 5 shows an example of customization of the facsimile function selection button in the image processing apparatus 301 according to the first embodiment. Numeral 510 denotes designation of unit to input image data to be transmitted. Numeral 511 denotes designation of an image processing apparatus to perform image processing on the input image data. Numeral 512 denotes designation of an image processing apparatus to perform output processing (FAX, printing, transfer, storage) to output image data subjected to the image processing.

In the first embodiment, in image data input processing, image data read with a scanner of another image processing apparatus or image data stored in the storage unit 109 of the image processing apparatus can be designated. Further, in output processing, printing, facsimile transmission, transfer to another image processing apparatus, or storing into the storage unit 109 can be set.

Figure 6:
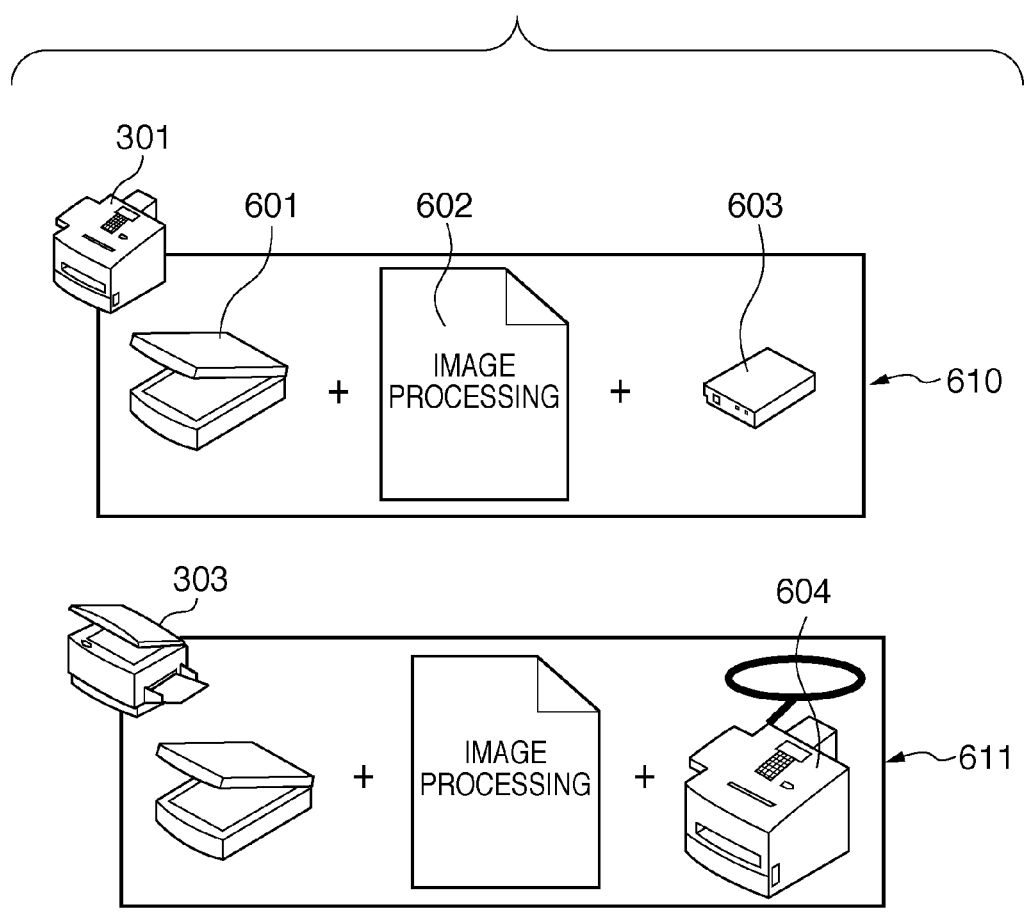
FIG. 6 depicts a view illustrating an example of a facsimile function customized in the image processing apparatus according to the first embodiment and distribution of the facsimile function to another image processing apparatus.

FIG. 6 depicts a view illustrating an example of a facsimile function customized in the image processing apparatus 301 according to the first embodiment and distribution of the facsimile function to the other image processing apparatus 303.

Numeral 610 denotes the facsimile function set in the image processing apparatus 301. In this example, upon facsimile transmission, a scanner section 601 to read an original image to generate image data, an image processing section 602 to process the image data, and a facsimile section 603 are designated.

The facsimile function registered in the image processing apparatus 301 is registered in the customized UI setting data. Then the customized UI setting data is distributed from the image processing apparatus 301 to the image processing apparatus 303 which lacks a facsimile transmission function. Numeral 611 denotes data distributed to the image processing apparatus 303 in this manner.

In this case, the image processing apparatus 303 has a scanner unit to read image data and an image processing unit to process the read image data. However, as the image processing apparatus 303 lacks a function corresponding to the facsimile section 603, it performs a function substitution processing to substitute the function with a function of the another image processing apparatus connected to the network 302.

More particularly, for adaptation to the customized UI setting data, another image processing apparatus having the facsimile output function is retrieved on the network 302. If an apparatus that has the facsimile output function is retrieved, then the processing corresponding to the facsimile section 603 on the customized UI setting data is substituted with (changed to) a remote facsimile function 604 utilizing the function of the retrieved apparatus.

Figure 7:
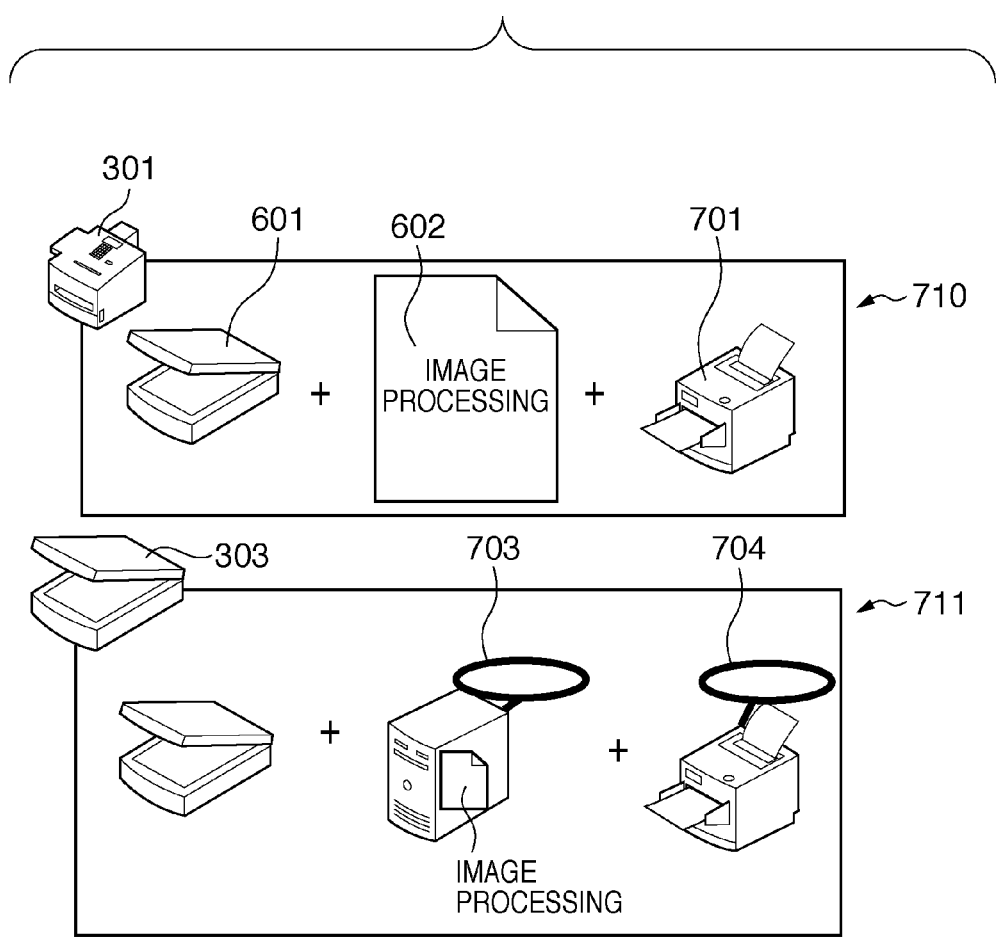
FIG. 7 depicts a view illustrating an example of a copy function customized in the image processing apparatus according to the first embodiment and distribution of the copy function to the other image processing apparatus.

FIG. 7 depicts a view illustrating an example of a copy function customized in the image processing apparatus 301 according to the first embodiment and distribution of the copy function to the other image processing apparatus 303.

Upon copying in the image processing apparatus 301, the copy function can be realized by designating the scanner section 601 to read an original image to generate image data, the image processing section 602 to process the read image data and an image forming section 701, as shown 710. The copy function is registered in the customized UI setting data, and the customized UI setting data is distributed to the image processing apparatus 303 which lacks, for example, a print function and an image processing function. In this case, as the image processing apparatus 303 lacks an image processing function for processing image data and a function for printing the image data, the image processing apparatus 303 performs the function substitution processing to substitute these functions with functions of another image processing apparatus connected to the network 302.

More particularly, for adaptation to the customized UI setting data, another image processing apparatus having the print function and the image processing function is retrieved on the network 302. If an apparatus that has the functions is retrieved, then setting is made so as to substitute the processings corresponding to the image processing section 602 and the image forming section 701 on the customized UI setting data with an image processing function 703 and a print function 704 of the retrieved image processing apparatus, as shown 711.

FIG. 8 is a flowchart describing processing for transmission of customized UI setting data from a first image processing apparatus to a second image processing apparatus in the image processing system according to the first embodiment. In this example, UI distribution is performed from the image processing apparatus 301 corresponding to the first image processing apparatus to the image processing apparatus 303 corresponding to the second image processing apparatus. Note that a program to perform the processing is stored in the storage unit 109 of the respective image processing apparatuses, and executed under the control of the CPU 108 of the respective image processing apparatuses.

First, in the image processing apparatus 301, the transmission destination (in this example, the image processing apparatus 303) of the customized UI setting data is set in step S801. Then in step S802, a destination confirmation message is transmitted to the image processing apparatus 303, set as the transmission destination, to confirm whether or not the image processing apparatus 303 is capable of receiving data from the image processing apparatus 301. Then in step S803, a message indicating whether or not the image processing apparatus 303 is capable of reception is received from the image processing apparatus 303. In this example, a reception enable message indicating that the image processing apparatus 303 is capable of reception is received. Then the image processing apparatus 301 becomes in an information distribution mode to transmit the customized UI setting data and starts distribution preparation (step S804).

On the other hand, the image processing apparatus 303 starts reception preparation in step S805. When the reception preparation has been completed, the image processing apparatus 303 transmits a reception start possible message to the image processing apparatus 301 (step S806). Then in step S807, the image processing apparatus 301 transmits the customized UI setting data to the image processing apparatus 303. When the transmission of the customized UI setting data has been completed, the image processing apparatus 301 transmits a transmission completion message to the image processing apparatus 303 in step S5808. When the reception of the customized UI setting data has been completed in the image processing apparatus 303, the image processing apparatus 303 transmits a reception completion message to the image processing apparatus 301 in step S809.

By this processing, the UI setting data customized in the image processing apparatus 301 can be transmitted to the image processing apparatus 303 and displayed as a UI screen of the image processing apparatus 303.

FIG. 9 is a flowchart describing processing by the image processing apparatus which received the customized UI setting data in the image processing system according to the first embodiment. In this example, the image processing apparatus 303 which received the customized UI setting data determines whether or not the image processing apparatus 303 itself can perform a function included in the customized UI setting data. When it is determined that the function cannot be performed by the image processing apparatus 303 itself, setting is made so as to utilize a function of another image processing apparatus. Note that a program to perform the processing is stored in the storage unit 109 of the image processing apparatus 303, and executed under the control of the CPU 108.

First, in step S901, it is determined whether or not the customized UI setting data has been normally received. When it is determined that the customized UI setting data has been normally received, the process proceeds to step S902, otherwise, setting is made not so as to use the customized UI setting data, and the process ends. In step S902, a comparison is made between a function included in the received customized UI setting data and the function of the image processing apparatus 303, and it is determined whether or not the function included in the UI setting data can be performed by the image processing apparatus 303 itself. If it is determined that the function can be performed by the image processing apparatus 303, then the process proceeds to step S904, while if it is determined that the function cannot be performed by the image processing apparatus 303, then the process proceeds to step S903. In step S903, setting is made so as to substitute the function which cannot performed by the image processing apparatus 303 with a function of another image processing apparatus (remote control). Then in step S904, function adjustment is performed so as to utilize the function included in the received customized UI setting data by the image processing apparatus 303.

Figure 10:
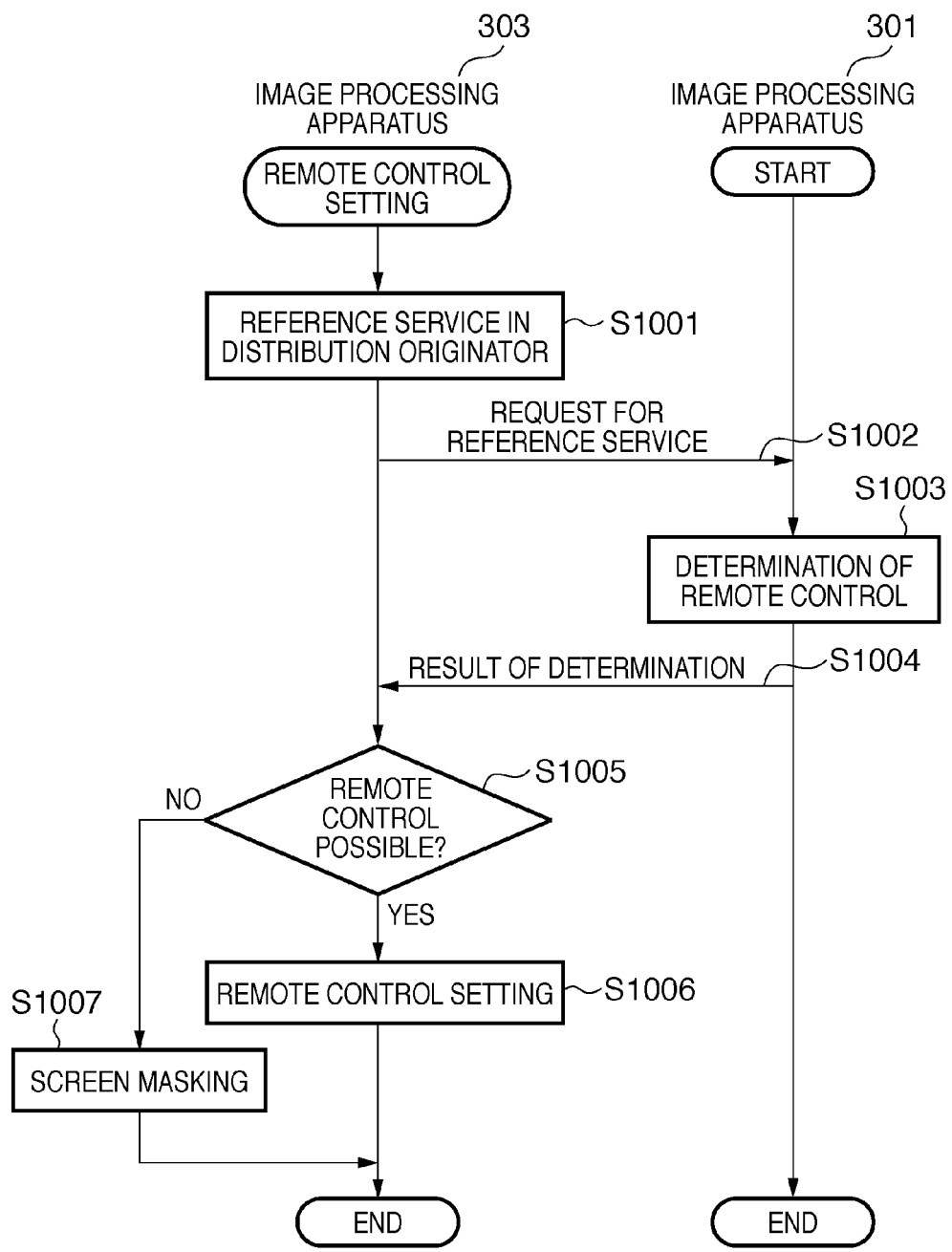
FIG. 10 is a flowchart describing processing when the image processing apparatus which received the customized UI setting data cannot perform a function displayed on a UI screen, in the image processing system according to the first embodiment.

FIG. 10 is a flowchart describing processing when the image processing apparatus 303 which received the customized UI setting data cannot perform a function displayed on its UI screen in the image processing apparatus 303 according to the first embodiment. Note that a program to perform the processing is stored in the storage unit 109 of the respective image processing apparatuses, and executed under the control of the CPU 108 of the respective image processing apparatuses.

This processing is started by the remote control setting processing in step S903 in FIG. 9. First, in step S1001, the image processing apparatus 301, as the distribution originator of the customized UI setting data, is requested to check whether or not the image processing apparatus 301 has a function which is not included in the image processing apparatus 303. In step S1002, a reference service message is transmitted to the image processing apparatus 301 from the image processing apparatus 303. Then in step S1003, the image processing apparatus 301 determines whether or not the required function of the image processing apparatus 301 can be utilized by the image processing apparatus 303 via the network 302. Then the result of determination is returned to the image processing apparatus 303 in step S1004.

In step S1005, the image processing apparatus 303 receives the result, and determines whether or not the function that the image processing apparatus 303 lacks can be substituted (remote-controlled) with the function of the image processing apparatus 301. If it is determined that the remote control is possible, the process proceeds to step S1006, at which the function is set and registered so as to be substituted with the function of the image processing apparatus 301. That is, the setting to start the function operation program of the image processing apparatus 303 and perform the processing is changed to setting to cause the image processing apparatus 301 to perform the processing corresponding to the required function. This setting includes information to specify the image processing apparatus 301 (IP address, apparatus name and the like) and information to specify a required function to be performed. When a button corresponding to the set function is depressed, in place of starting the function operation program of the image processing apparatus 303 and performing the function, the image processing apparatus 301 is requested to perform the function. For example, image data obtained by reading an original with the scanner unit of the image processing apparatus 303 is transmitted by the facsimile function of the image processing apparatus 301. At this time, a screen to designate a facsimile transmission destination is obtained by the image processing apparatus 303 from the image processing apparatus 301. On the other hand, if it is determined in step S1005 that remote control is impossible, the process proceeds to step S1007, at which the selection button of the required function in the UI screen is masked so as not to allow the user to select the button.

As described above, according to the first embodiment, it is possible to transmit UI setting data generated by an image processing apparatus (first image processing apparatus) to another image processing apparatus (second image processing apparatus), and display a UI screen of the second image processing apparatus based on the UI setting data. At this time, if the UI setting data includes a function which cannot be performed by the second image processing apparatus, the function can be substitutionally performed by another image processing apparatus having the function by cooperation with the second image processing apparatus. With this arrangement, the image processing apparatus displaying the UI screen seemingly performs the function displayed on the UI screen received from the other image processing apparatus.

In the above-described first embodiment, if the image processing apparatus 303 that received the customized UI setting data cannot perform a function displayed on the UI screen based on the customized UI setting data, the image processing apparatus 303 utilizes a function of the image processing apparatus 301 as a transmission originator since there is a high probability that the transmission originator, the image processing apparatus 301, has the corresponding function.

On the other hand, in the second embodiment, when the function of the image processing apparatus 301 as the transmission originator cannot be utilized, it is determined whether or not the functions previously registered in the image processing apparatus 303 include corresponding function. That is, it is determined whether or not setting for performing processing of the corresponding function in cooperation with another image processing apparatus on the network is already registered in the image processing apparatus 303. When it is determined such setting is registered, the function is utilized. With this arrangement, the corresponding function can be utilized by cooperative processing utilizing an apparatus other than the transmission originator image processing apparatus 301. Note that as the image processing system and the image processing apparatus according to the second embodiment have the same configurations as those in the above-described first embodiment, the explanations of the configurations of the image processing system and the image processing apparatus will be omitted.

Figure 11:
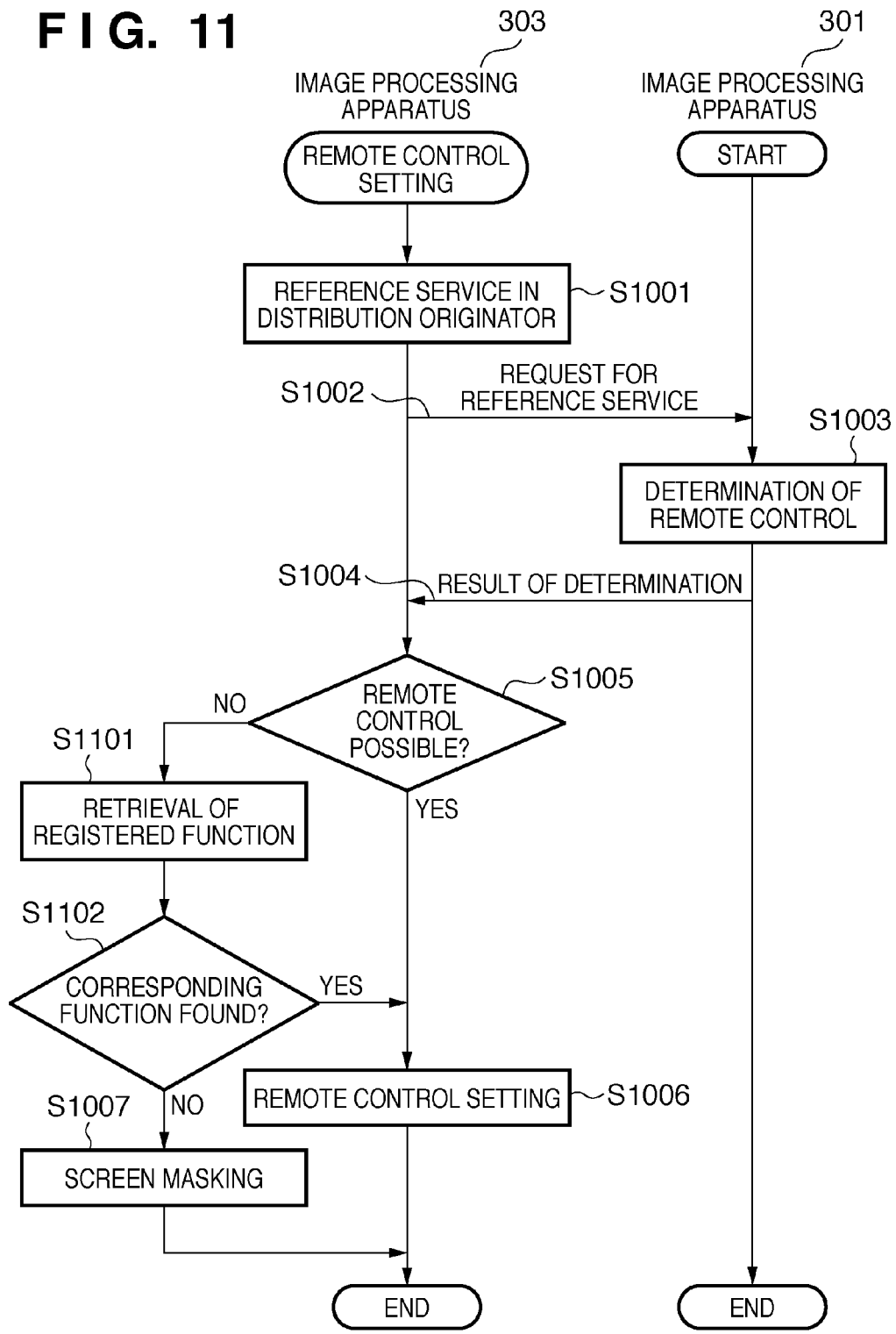
FIG. 11 is a flowchart describing processing when the image processing apparatus which received the customized UI setting data cannot perform a function displayed on the UI screen, in the image processing system according to a second embodiment of the present invention.

FIG. 11 is a flowchart describing processing when the image processing apparatus 303 which received the customized UI setting data cannot perform a function included in the UI setting data in the image processing system according to a second embodiment. Note that a program to perform the processing is stored in the storage unit 109 of the respective image processing apparatuses, and executed under the control of the CPU 108 of the respective image processing apparatuses. Note that in FIG. 11, steps corresponding to those in FIG. 10 have the same reference numerals and the explanations of these steps will be omitted.

In step S1005, if it is determined that remote control cannot be performed with the function of the image processing apparatus 301, the process proceeds to step S1101. In step S1101, a corresponding function is retrieved from the functions registered in the image processing apparatus 303. Then in step S1102, the result of retrieval is reviewed, and if the corresponding function is registered, the process proceeds to step S1006, in which the received UI setting data is changed and the registered function is registered as a remote function. In this case, if plural candidate functions are retrieved, the user may select and register an optimum function. Further, the functions may be registered with priorities in accordance with position information of respective image processing apparatuses. Further, it may be arranged such that plural apparatuses are registered, and upon use of the corresponding function, one of the apparatus can be selected. On the other hand, if it is determined in step S1102 that the corresponding function is not registered, then the process proceeds to step S1007, at which masking or the like is performed on a corresponding function selection button on the UI screen so as to prevent the user's selection of the function selection button.

As described above, according to the second embodiment, according to the second embodiment, it is possible to transmit UI setting data generated by an image processing apparatus (first image processing apparatus) to another image processing apparatus (second image processing apparatus), and display a UI screen of the second image processing apparatus based on the UI setting data. At this time, if the UI setting data includes a function which cannot be performed by the second image processing apparatus, then the function can be substituted with a function registered in the second image processing apparatus. With this arrangement, the second image processing apparatus displaying the UI screen seemingly performs the function displayed on the UI screen received from the other image processing apparatus.

In a third embodiment of the present invention, if the image processing apparatus 303 that received the customized UI setting data cannot perform a function displayed on the UI screen, then another image processing apparatus connected to the network 302 is retrieved. If an image processing apparatus having the function is retrieved, the function that cannot be performed by the image processing apparatus 303 is substituted with the function of the retrieved image processing apparatus. Note that as the image processing system and the image processing apparatus according to the third embodiment have the same configurations as those in the above-described first embodiment, the explanations of the configurations of the image processing system and the image processing apparatus will be omitted.

FIG. 12 depicts a view illustrating an example of a UI screen display upon retrieval of an image processing apparatus which has a substitutional function, in the image processing system according to the third embodiment of the present invention.

If the image processing apparatus 303 that received the customized UI setting data cannot perform a function included in the UI setting data, the image processing apparatus 303 retrieves an image processing apparatus having the function on the network 302. If the image processing apparatus 305 has the function, then the function is assigned as a function of the image processing apparatus 303. In this example, the construction of the network 302 is displayed, and the user touches the image processing apparatus that resulted from the retrieval on the screen, thereby designating the apparatus.

Figure 13:
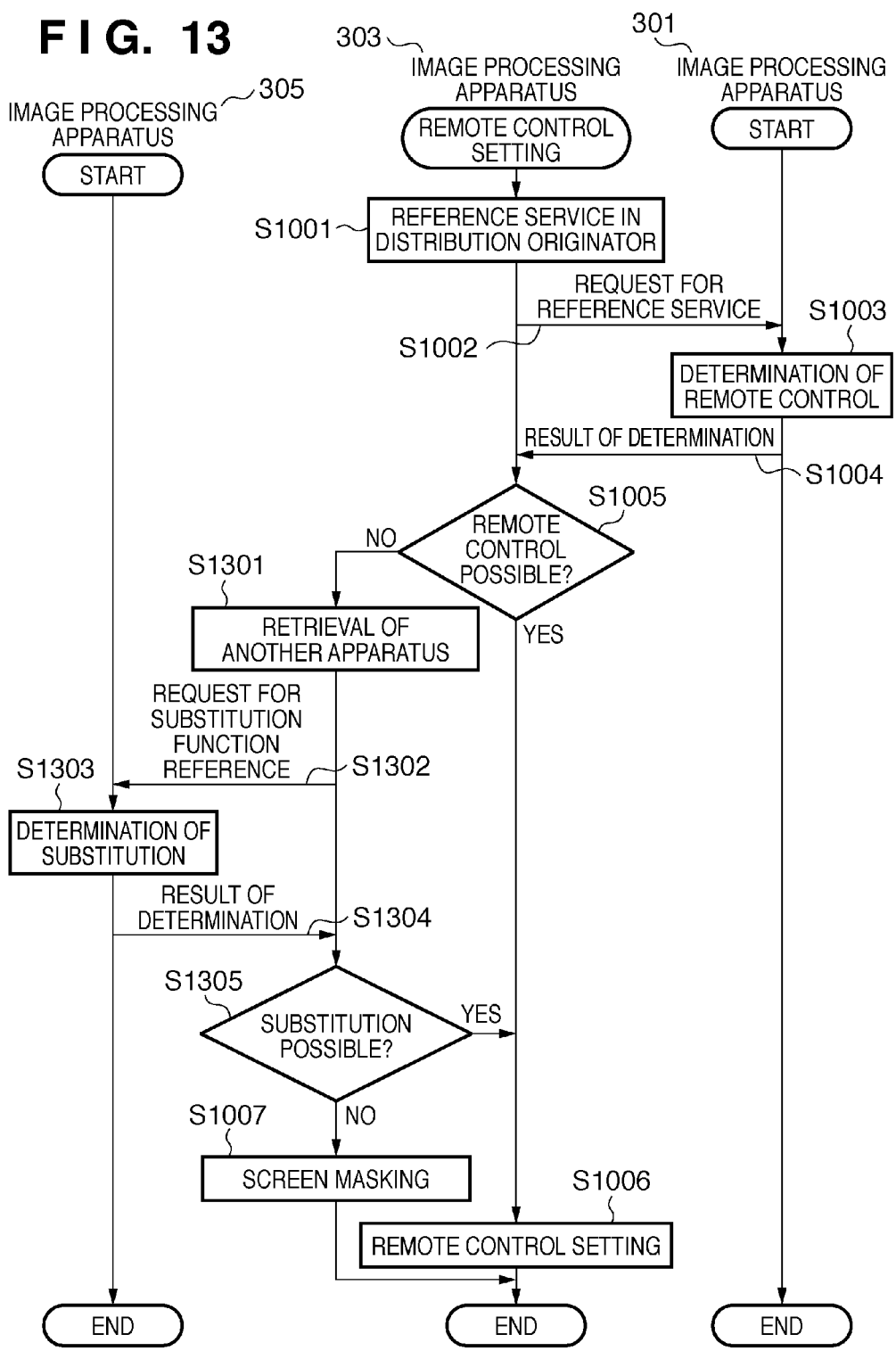
FIG. 13 is a flowchart describing processing when the image processing apparatus which received the customized UI setting data cannot perform a function displayed on the UI screen, in the image processing system according to the third embodiment.

FIG. 13 is a flowchart describing processing when the image processing apparatus 303 which received the customized UI setting data cannot perform a function displayed on the UI screen corresponding to the UI setting data in the image processing system according to the third embodiment. Note that a program to perform the processing is stored in the storage unit 109 of the respective image processing apparatuses, and executed under the control of the CPU 108 of the respective image processing apparatuses. Note in FIG. 13, steps corresponding to those in FIG. 10 have the same reference numerals and the explanations of these steps will be omitted.

In step S1005, if it is determined that remote control is impossible, the process proceeds to step S1301. In step S1301, a retrieval of an image processing apparatus having the required function existing on the network 302 is started. Then in step S1302, the image processing apparatus 303 transmits a substitute function reference service message on the network 302. The image processing apparatus 305 which receives the substitute function reference service message determines whether or not the image processing apparatus 305 has a substitution function to enable use of its function by another image processing apparatus (step S1303). Then in step S1304, the image processing apparatus 305 returns the result of determination to the image processing apparatus 303.

Then the image processing apparatus 303 determines the result of determination in step S1305. If it is determined that the image processing apparatus 305 has a corresponding function and the function can be utilized, then the process proceeds to step S1006, in which the setting of the received UI setting data is changed and the function of the image processing apparatus 305 is registered as a remote function. Note that when plural candidates are retrieved at this time, the user may select and registers an optimum function. On the other hand, if it is determined in step S1305 that the corresponding function cannot be utilized as a remote function or there is no image processing apparatus which can substitutionally perform the function, then the process proceeds to step S1007. In step S1007, a function selection button corresponding to the function is masked (selection-disabled) so as not to allow the user to select the button.

As described above, according to the third embodiment, it is possible to transmit UI setting data generated by some image processing apparatus (first image processing apparatus) to another image processing apparatus (second image processing apparatus), and display a UI screen of the transmission-destination image processing apparatus based on the UI setting data. At this time, if the UI setting data includes a function which cannot be performed by the second image processing apparatus, then the function can be substituted with a function of another image processing apparatus connected to the network 302. With this arrangement, the image processing apparatus displaying the UI screen seemingly performs the function displayed on the UI screen based on the UI setting data received from the other image processing apparatus.

Note that in the above-described first to third embodiments, the UI setting data is received, and a screen is displayed in accordance with the received UI setting data, however, the present invention is not limited to this arrangement. For example, upon assignment of functions to the hard keys of the image processing apparatus in accordance with received UI setting data, setting may be performed such that, when the image processing apparatus cannot perform a function, the function can be substantially performed by another apparatus. In this case, the assignment to the respective hard keys is separately notified to the user (for example, the contents of the assignment may be printed).

Figure 14:
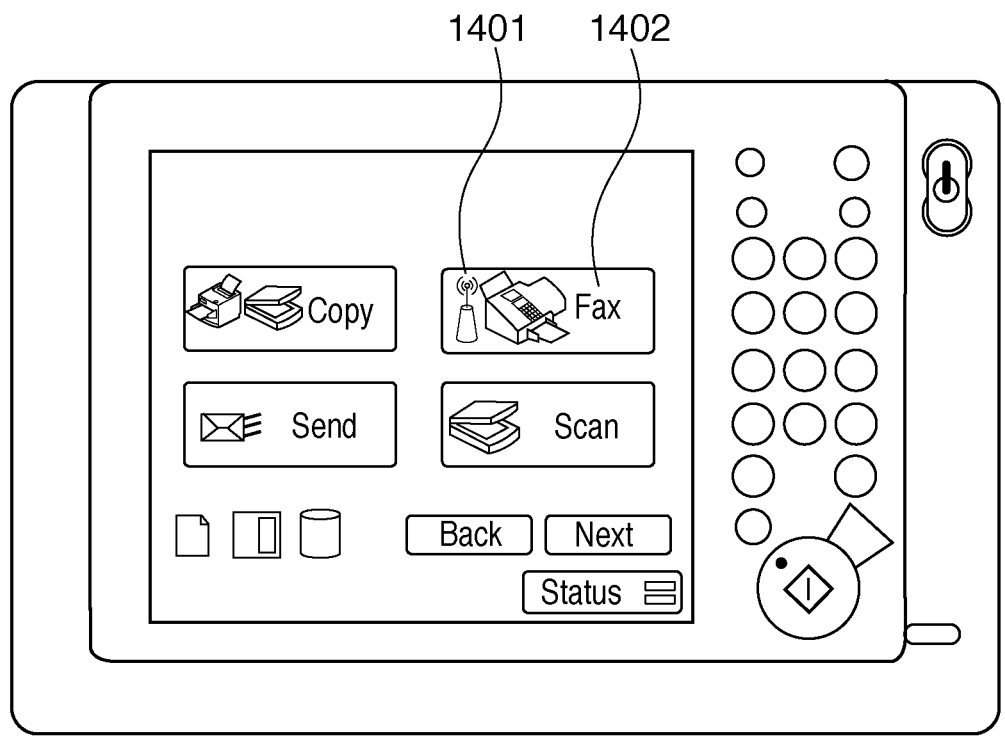
FIG. 14 depicts a view illustrating an example of the UI screen display when a function is substituted.

FIG. 14 illustrates an example of the UI screen display when a function is substitutionally performed by another image processing apparatus in any one of the above-described first to third embodiments.

Upon display of a UI screen based on received UI setting data, if there is a function which cannot be performed by the image processing apparatus 303, the function is substituted with a function of another apparatus as described above. In this case, a mark 1401 is attached to the function selection button 402 in the UI screen and the UI screen is displayed. Then the function selection button 402 is available similarly to the normal function selection button. In this example, the display is produced such that the substitution of facsimile function (Fax) with a function of another apparatus is recognizable.

Figure 15:
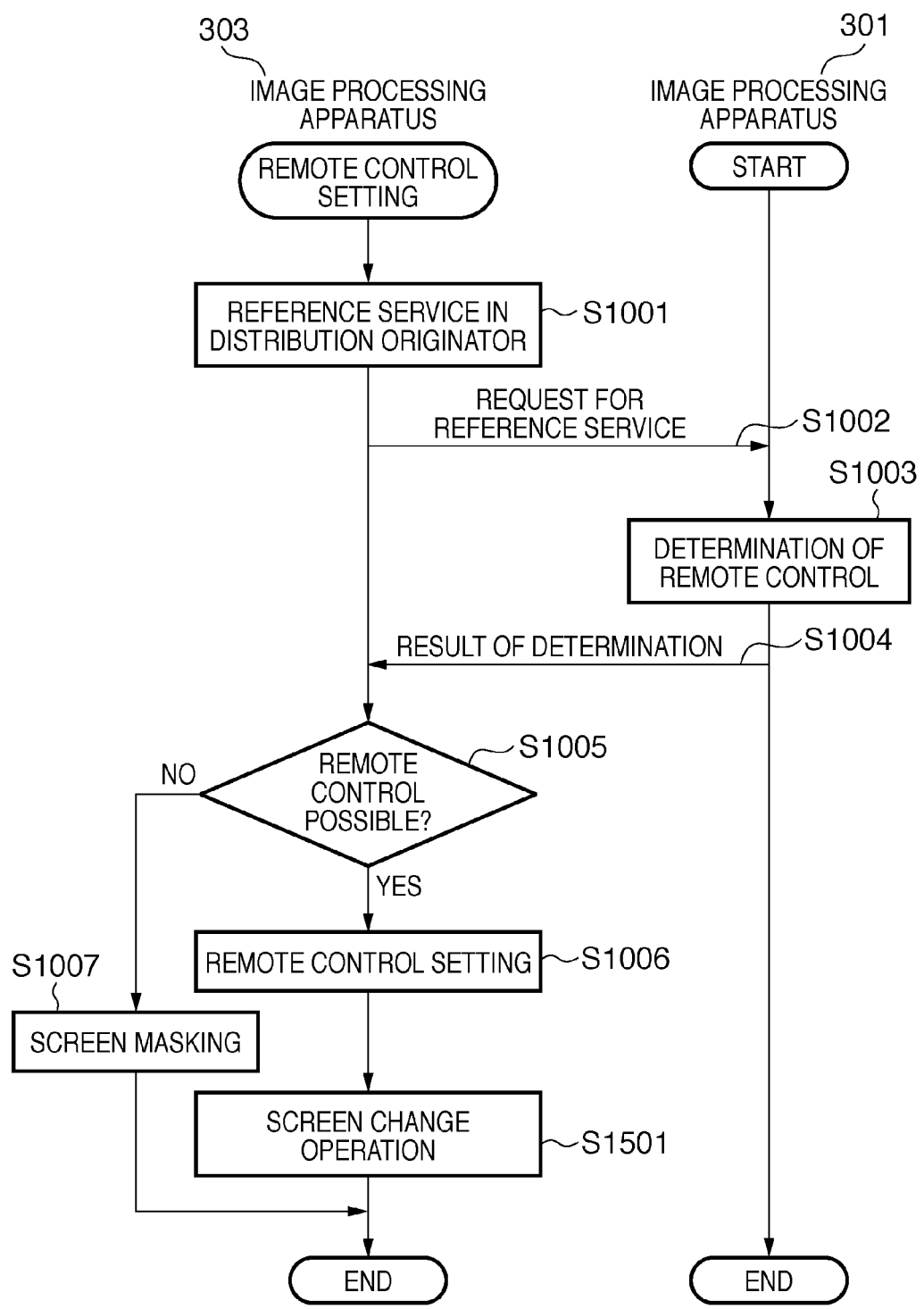
FIG. 15 is a flowchart describing processing for changing a function selection button when an image processing apparatus 303 substitutes a function displayed on the UI screen with a function of an image processing apparatus as a transmission originator.

FIG. 15 is a flowchart describing processing by the image processing apparatus 303 for changing the function selection button when a function displayed on the UI screen of the console unit 107 is substituted with a function of an image processing apparatus as a transmission originator. Note that a program to perform the processing is stored in the storage unit 109 of the respective image processing apparatuses, and executed under the control of the CPU 108 of the respective image processing apparatuses. Note that in FIG. 15, steps corresponding to those in FIG. 10 have the same reference numerals and the explanations of these steps will be omitted.

In step S1005, if it is determined that remote control by the image processing apparatus 301 is possible, then the process proceeds to step S1006, in which the corresponding function of the image processing apparatus 301 is changed and set as a remote function. At this time, if plural candidates are retrieved, the user selects and registers an optimum one among the plural candidates. Further, the functions may be registered with priorities in accordance with position information of the image processing apparatuses. Further, it may be arranged such that multiple apparatuses are registered, and upon use of the corresponding function, one of the apparatuses is selected. Then process proceeds to step S1501, in which to notify the user of setting of remote control, a function selection button of the remote function is changed. More particularly, as shown in FIG. 14, the mark 1401 is attached to the selection button of the corresponding function, and the display is produced such that the substitution of the function is recognizable.

Note that as described in the second and third embodiments, if substitution is performed with a function registered in the image processing apparatus 303 or the substitution is performed by another image processing apparatus on the network 302, the mark 1401 is attached to the function selection button and the UI screen is displayed. At this time, the apparatus to substitutionally perform the function can be displayed.

Figure 16:
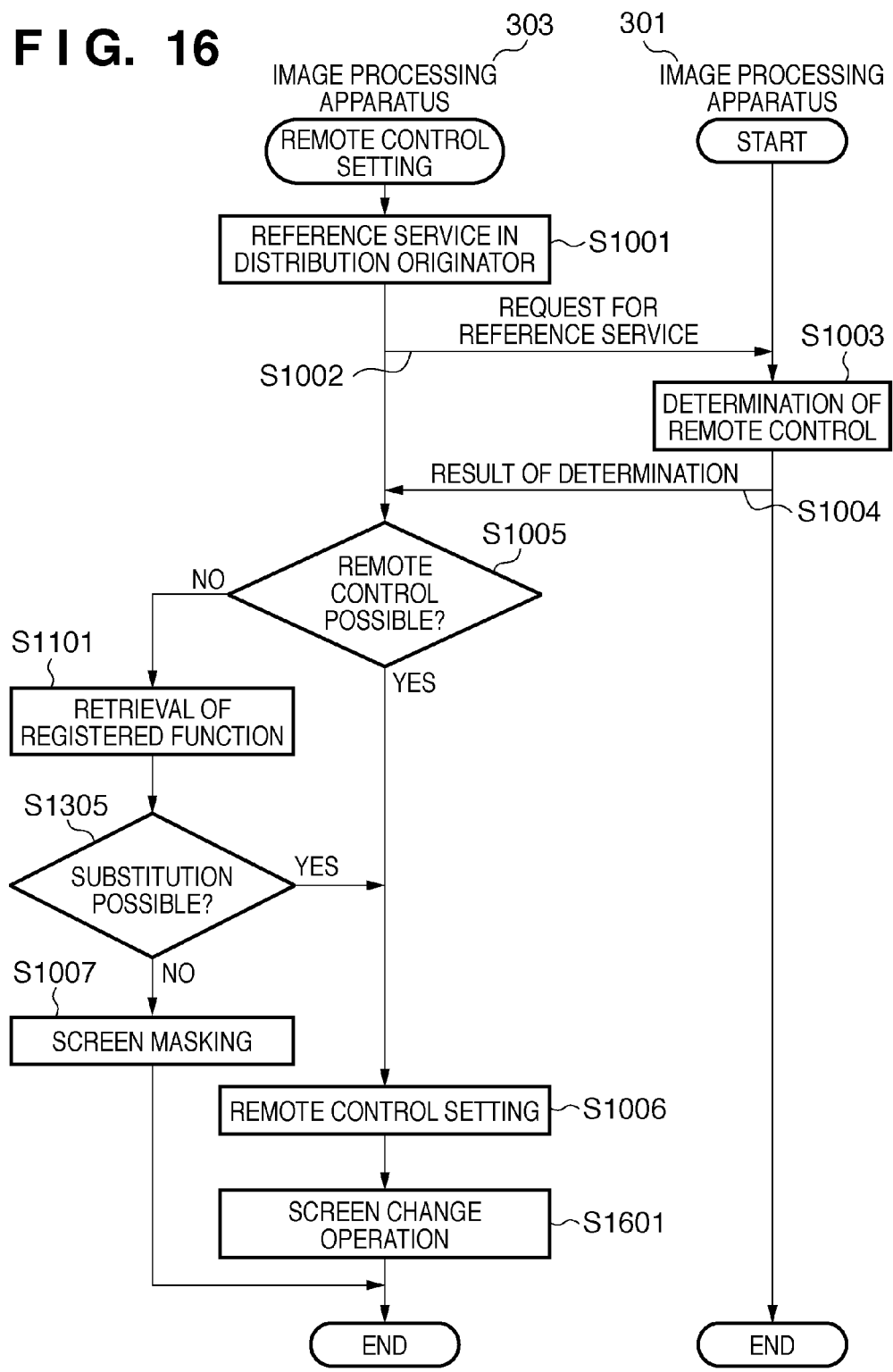
FIG. 16 is a flowchart describing processing for changing the function selection button when the image processing apparatus cannot perform a function displayed on the UI screen and substitutes the function with its registered function.

FIG. 16 is a flowchart describing processing for changing the function selection button if the image processing apparatus 303 cannot perform a function displayed on the UI screen and the function is substituted with its already registered function. Note that a program to perform the processing is stored in the storage unit 109 of the respective image processing apparatuses, and executed under the control of the CPU 108 of the respective image processing apparatuses. Note that in FIG. 16, steps corresponding to those in FIG. 10 have the same reference numerals and the explanations of these steps will be omitted.

In step S1005, if it is determined that remote control between the image processing apparatus 303 and the image processing apparatus 301 is impossible, then the process proceeds to step S1101, in which a function registered in the image processing apparatus 303 is retrieved. Then in step S1305, if it is determined a corresponding function exists, then the process proceeds to step S1006, in which the function is changed and set as a remote function. Further, if multiple candidates are retrieved, then the user may select and register an optimum one. Then the process proceeds to step S1601, in which the function selection button is changed so as to notify the user of the setting of substitution function. If it is determined in step S1305 that there is no corresponding function, then the process proceeds to step S1007, in which a function selection button of the function is masked such that the user cannot select the button. More particularly, as shown in FIG. 14, the mark 1401 is attached to the function selection button of the corresponding function and the screen is displayed.

Note that as described in the third embodiment, if the corresponding function cannot be performed by the apparatus itself, then another image processing apparatus which can substitutionally perform the function on the network is retrieved, and changing and setting is performed for substitution by the retrieved apparatus, the display is changed as this procedure.

Figure 17:
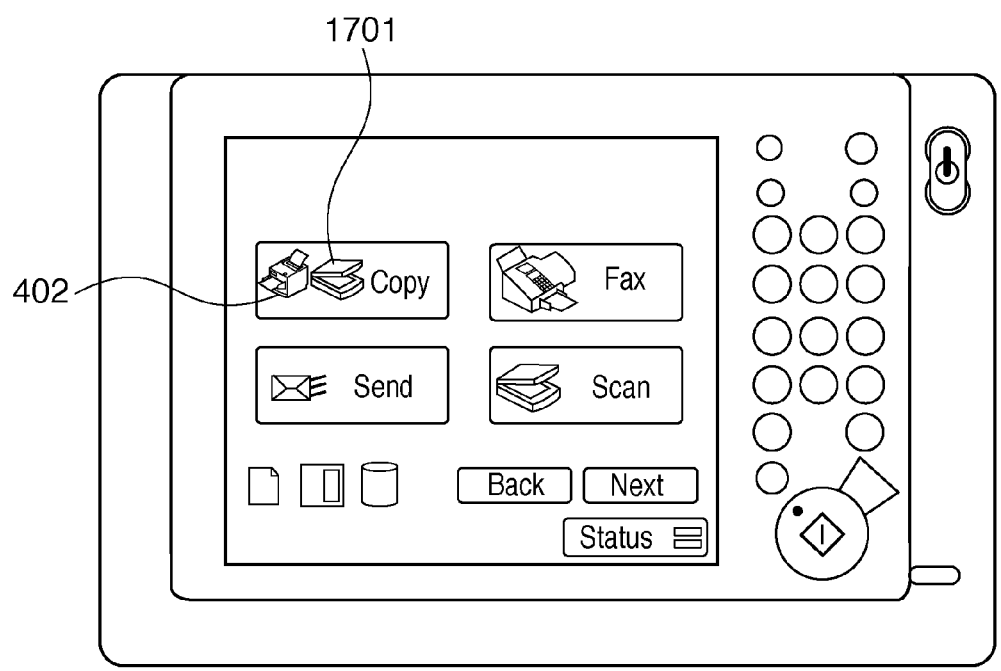
FIG. 17 depicts a view illustrating another example of the UI screen display when a function is substituted.

FIG. 17 depicts a view illustrating another example of the UI screen display when a function is substituted.

When received UI setting data is used, changing and setting is performed such that a function which is not included in the image processing apparatus 303 is substituted with a function of another image processing apparatus. In this case, the function selection button 402 with a mark 1701 indicating the function substitution is displayed. When the user depresses the button, the function is selected.

Note that in the above-described embodiments, the UI setting data is directly transmitted/received among the image processing apparatuses, however, the present invention is not limited to this arrangement. That is, it may be arranged such that a server to hold the UI setting data is provided, and the image processing apparatus receives the UI setting data from the server and uses the data. Further, it may be arranged such that the UI setting data is stored in a portable storage device, and the image processing apparatus reads the UI setting data from the device and uses the data.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2009-037054, filed Feb. 19, 2009, which is hereby incorporated by reference herein in its entirety.

What is claimed is:

1. A first image processing apparatus, comprising:
   a reception unit that receives UI setting data corresponding to a first operation screen for operating another image processing apparatus, wherein the first operation screen includes a function selection button to which a plurality of processes are assigned, and wherein when the function selection button is depressed, the plurality of processes assigned to the function selection button are executed;
   a determination unit that determines whether or not at least one of the plurality of processes assigned to the function selection button is not able to be executed by the first image processing apparatus, based on the UI setting data received by the reception unit;

a retrieval unit that retrieves, if the determination unit determines that the first image processing apparatus cannot execute at least one of the plurality of processes, a second image processing apparatus, on a network, which can execute a process that the first image processing apparatus cannot execute;

a change unit that changes the UI setting data received by the reception unit to setting for substitutional execution of the process that the first image processing apparatus cannot execute, by the second image processing apparatus retrieved by the retrieval unit; and a display control unit that controls to display a second operation screen for operating the first image processing apparatus in accordance with the UI setting data changed by the change unit.

2. The first image processing apparatus according to claim 1, wherein the retrieval unit retrieves the another image processing apparatus as a transmission originator of the UI setting data.

3. The first image processing apparatus according to claim 1, wherein the UI setting data is customized by the another image processing apparatus as a transmission originator of the UI setting data.

4. The first image processing apparatus according to claim 1, wherein the display control unit controls to display the second operation screen so that the substitution of the process by the second image processing apparatus is recognizable in accordance with the UI setting data, if the change unit changes the UI setting data to setting for substitutional execution by the second image processing apparatus.

5. The first image processing apparatus according to claim 1, further comprising a selection disable unit that, if the determination unit determines that the first image processing apparatus cannot execute at least one of the plurality of processes assigned to the function selection button and that there is no image processing apparatus which can execute the process that the first image processing apparatus cannot execute, disables a designation of the function selection button.

6. The first image processing apparatus according to claim 1, further comprising a selection unit that, if the retrieval unit retrieves multiple image processing apparatuses which can execute the process that the first image processing apparatus cannot execute, selects the second image processing apparatus to substitutionally execute the process among the multiple image processing apparatuses.

7. A control method for first image processing apparatus, the method comprising:

receiving UI setting data corresponding to a first operation screen for operating another image processing apparatus, wherein the first operation screen includes a function selection button to which a plurality of processes are assigned, and wherein when the function selection button is depressed, the plurality of processes assigned to the function selection button are executed;

determining whether or not at least one of the plurality of processes assigned to the function selection button is not able to be executed by the first image processing apparatus, based on the UI setting data received in the receiving step;

retrieving a second image processing apparatus, on a network, which can execute a process that the first image processing apparatus cannot execute, if it is determined in the determining step that the first image processing apparatus cannot execute at least one of the plurality of processes;

changing the UI setting data received in the receiving step to setting for substitutional execution of the process that the first image processing apparatus cannot execute by the second image processing apparatus retrieved in the retrieving step; and displaying a second operation screen for operating the first image processing apparatus in accordance with the UI setting data changed in the changing step.

8. A non-transitory computer-readable storage medium storing a program for performing the respective steps of the control method according to claim 7 by a computer.

9. A first image processing apparatus, comprising:

receiving means for receiving UI setting data corresponding to a first operation screen for operating another image processing apparatus, wherein the first operation screen includes a function selection button to which a plurality of processes are assigned, and wherein when the function selection button is depressed, the plurality of processes assigned to the function selection button are executed;

first determining means for determining whether or not at least one of the plurality of processes assigned to the function selection button is not able to be executed by the first image processing apparatus, based on the UI setting data received by the receiving means;

second determining means for, in response to the first determining means determining that the first image processing apparatus cannot execute at least one of the plurality of processes assigned to the function selection button, determining whether or not there is another image processing apparatus that is able to execute a process that the first image processing apparatus cannot execute; and displaying means for, in response to the second determining means determining that there is another image processing apparatus that is able to execute the process, displaying to a user an indication that the another image processing apparatus is able to execute the process.

10. The first image processing apparatus according to claim 9, wherein the displaying means, in response to the second determining means determining that there is not another image processing apparatus that is able to execute the process, masks display of a button corresponding to the process.

11. The first image processing apparatus according to claim 1, wherein the function selection button is a facsimile function selection button, and wherein the plurality of processes assigned to the function selection button comprise (a) a scanning process to read an original image to generate image data, (b) an image processing process to perform image processing on the image data, and (c) a facsimile process to output the image data having been subjected to image processing.

* * * * *